United States Patent [19]
Minemura et al.

[11] Patent Number: 5,608,710
[45] Date of Patent: Mar. 4, 1997

[54] PHASE CHANGING RECORDING MEDIUM WITH AMORPHOUS POINTS EACH FORMED BY A PAIR OF HIGH POWER AND LOW RECORDING PULSES

[75] Inventors: Hiroyuki Minemura, Kodaira; Tetsuya Fushimi, Kokubunji, both of Japan

[73] Assignee: Hitachi, Ltd., Tokyo, Japan

[21] Appl. No.: 371,152

[22] Filed: Jan. 11, 1995

[30]     Foreign Application Priority Data

Jan. 31, 1994  [JP]  Japan ..................................... 6-009117

[51] Int. Cl.$^6$ ..................................................... G11B 7/007
[52] U.S. Cl. ......................... 369/116; 369/275.2; 369/54
[58] Field of Search ............................... 369/116, 47, 54, 369/100, 275.2

[56]              References Cited

U.S. PATENT DOCUMENTS

| | | | |
|---|---|---|---|
| 5,107,482 | 4/1992 | Goto et al. | 369/116 |
| 5,257,256 | 10/1993 | Terao et al. | 369/116 |
| 5,305,297 | 4/1994 | Nishiuchi et al. | 369/116 |
| 5,367,514 | 11/1994 | Kobayashi et al. | 369/116 |
| 5,396,480 | 3/1995 | Morishita et al. | 369/116 |
| 5,479,392 | 12/1995 | Holtslag et al. | 369/116 |

FOREIGN PATENT DOCUMENTS 64-46231  2/1989  Japan.

*Primary Examiner*—Georgia Y. Epps
*Assistant Examiner*—Kim-Kwok Chu
*Attorney, Agent, or Firm*—Fay, Sharpe, Beall, Fagan, Minnich & McKee

[57]                    ABSTRACT

A spatially-independent N amorphous point train is formed by pulse width modulation of a laser to record information in a sample-servo optical disk drive used for a personal computer. Amorphous points are each formed by a pair of a high-power recording pulse WH and a lower power recording pulse WL for rewrite, conducted together with erasing of previous information by pairs of a high-power erasing pulse EH and a lower power erasing pulse EL with power relationships enabling integration of power per pulse of WH and WL with respect to time to substantially equal integration of power of EH and EL with respect to time, and control of recording pulse power such that a high-power level WH1 for all but a leading amorphous point is greater than a high-power level WH2 of the leading amorphous point, so that a low power level WL1 of all but a trailing amorphous point is less than a low power level WL2 of the trailing amorphous point. The time width of the high-power recording pulse is substantially equal to a time width of the lower power recording pulse and a time width of the high-power erasing pulse is substantially equal to a time width of a lower power erasing pulse. Laser power is adjusted in accordance with a power change from start to end of a train and in accordance with a recorded test pattern, periodically.

44 Claims, 11 Drawing Sheets

_5,608,710_

PHASE CHANGING RECORDING MEDIUM WITH AMORPHOUS POINTS EACH FORMED BY A PAIR OF HIGH POWER AND LOW RECORDING PULSES

BACKGROUND OF THE INVENTION

The present invention relates to an optical disk drive and medium for recording or reproducing information by applying a converged laser beam to information tracks concentrically or spirally formed on, for example, a discoid recording medium.

The recording methods of conventional optical disks in which data can be overwritten, as disclosed in Japanese Patent Laid-Open No. 46231/1989 and in U.S. Pat. No. 5,257,256, convert a recorded code train into pulses and rewrite, i.e. record new information while erasing old information.

SUMMARY OF THE INVENTION

It is an object of the present invention to analyze the prior art, determine problems and provide improvements thereover.

When the above methods are adapted to a record pulse width modulation (PWM), it is possible to symmetrically shape the record mark (amorphous point) formed as shown in FIG. 2, with respect to the front and rear ends of the mark even if the length differs, to prevent reproduction errors and realize high-density recording.

In the case of rewriting of a phase-change optical recording medium, data is recorded in a recording section of the medium by heating to melt the section to make it amorphous so that prior data is erased, and the old data is erased on the section by keeping the section between the crystallization temperature and the melting point to crystallize it. When the section is melted for recording, a record film material flows or segregates due to changes of volume, thermal conductivity and specific heat between solid and liquid phases, and asymmetry of temperature distribution on irradiation with record pulses; and thereby the recording characteristic changes. This causes the rewrite times to be limited.

It is an object of the present invention to provide an optical disk drive and medium for improving the durability, e.g. the rewrite times, in order to increase the density of a phase-change optical disk by adapting a specific record pulse width modulation.

To solve the above problem, the present invention records a record mark with a length of NL as N adjacent spatially-independent very-small amorphous points, each with a length of L or less. Thereby, because a melted area of one amorphous point does not reach an adjacent amorphous point (i.e. they are spatially independent), the flow of the record film is controlled to improve the rewrite life. The train of N (N is one or more) very-small spatially independent amorphous points is reproduced as a single signal with a length of approximately NL, when the interval L between the amorphous points of a train is approximately smaller than $\lambda/2NA$ in view of the resolution of a reproduction optical system, where the wavelength of the optical system is $\lambda$ and the numerical aperture is NA.

The present invention forms a train of spatially-independent very-small amorphous point marks on a phase-change optical medium for stable high density recording and improved rewrite times.

BRIEF DESCRIPTION OF THE DRAWINGS

Further objects, features and advantages of the present invention will become more clear from the following detailed description of a preferred embodiment, described with respect to the accompanying drawing:

FIG. 14 is an example of CAV format of an optical disk for a personal computer;

DETAILED DESCRIPTION OF A PREFERRED EMBODIMENT

The present invention will be described by referring to the accompanying drawings wherein like numerals refer to like parts.

Figure 3:
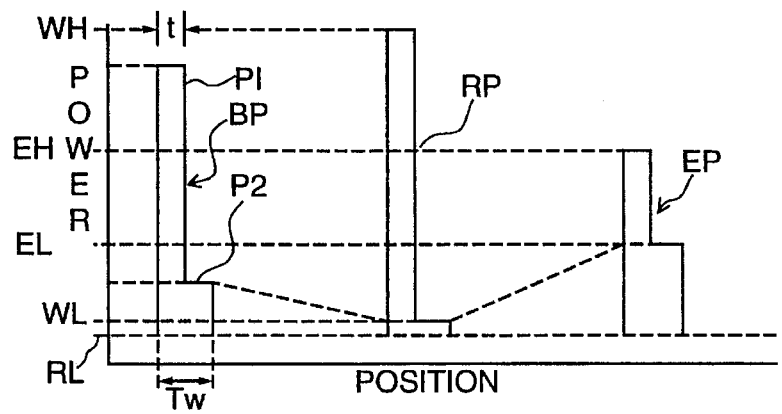
FIG. 3 illustrates the recording and erasing pulses that are formed from a basic signal.
Figure 4:
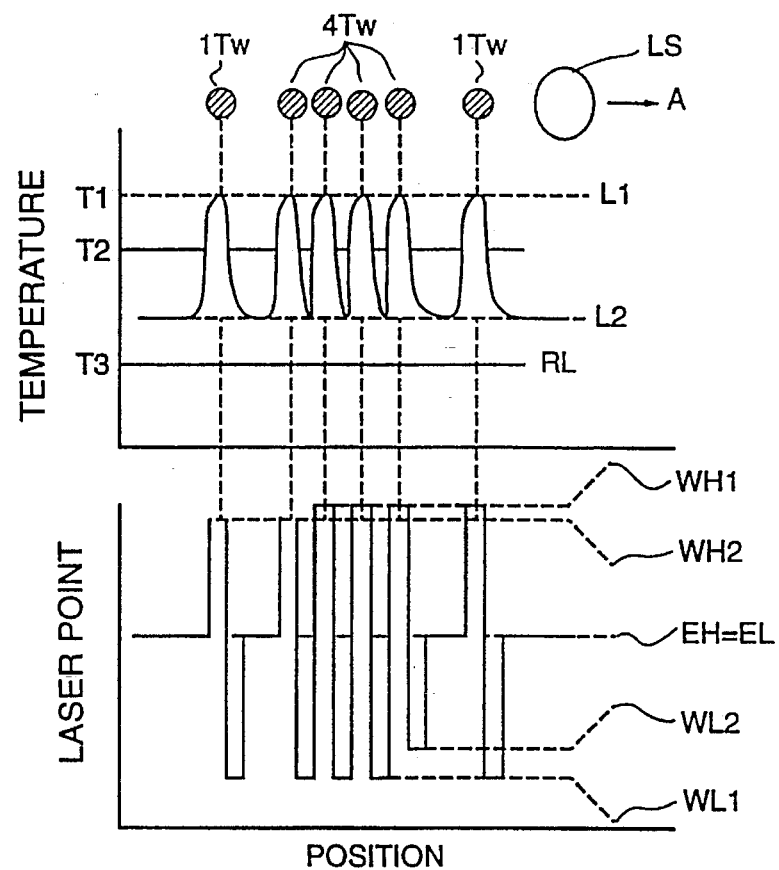
FIG. 4 shows power modulation of the laser beam for controlling ends of a long record mark.

Very small amorphous points or marks are formed by a laser recording pulse of time width Tw=L/v, where the length of the clock or minimum spacing of the marks is L and the linear velocity of the disk beneath the head is v. As shown in FIG. 3, a high-power pulse P1 with a width of t and a low-power pulse P2 with a width of Tw-t constitute a basic pulse BP formed by a pulse forming circuit based upon a servo clock or data clock. Because the width of the high-power pulse P1 is smaller than Tw(the clock period), the heat remaining in a recording medium and the thermal interference or heat transfer between adjacent amorphous point marks decrease and therefore a mark excellent in symmetry is formed when the basic pulse BP is converted into a recording pulse RP. An erasure pulse EP is also formed from the basic pulse BP by changing the values of power. It is preferable that the average value of light power density applied (the integration of laser beam power over the pulse width Tw) is approximately constant in the recording pulse RP and the erasure pulse EP. The expression WH/WL>EH/EL is maintained, where the high power value of a recording pulse RP is WH, the low power value of the recording pulse RP is WL, the high power value of an erasure pulse EP is EH, and the low power value of the erasure pulse EP is EL. Thus, the temperature L2 of the record film is approximately constant at the irradiation start position of both recording and erasure pulses applied subsequently to preceding pulses as shown in FIG. 4, and therefore control of the variation of the recording sensitivity and control of the thermal interference of formed marks are independent of whether the preceding pulse is a recording pulse RP or an erasure pulse EP. A read level RL of power is shown for reference.

Figure 1:
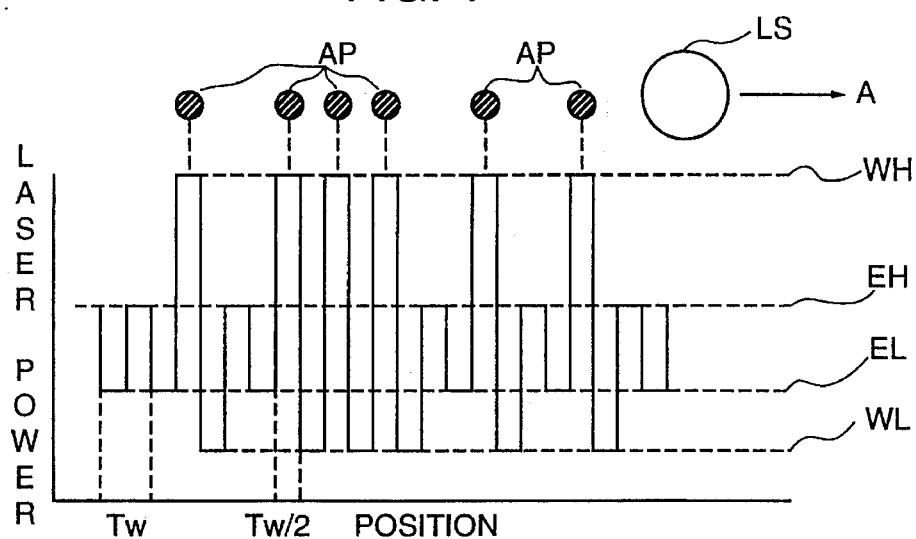
FIG. 1 shows the power pulse width modulation of a laser beam in the optical disk drive.

FIG. 1 shows laser power versus position (measured in time) between the laser and recording medium of the optical disk drive. The medium uses a discoid substrate covered with a thin film material mainly containing GeSbTe, InSbTe, and AgInSbTe as a recording film, which reversibly phase-changes between crystalline and amorphous states.

An irradiating energy beam, which is an electron beam or laser beam or the like, is preferably a laser beam and is applied to the optical disk medium by rotating the medium at approx. 1,800 rpm to move the laser beam light spot LS in the direction A relative to the medium and modulating the power of the laser beam as shown in FIG. 1. The light spot LS does not actually move but it relatively moves due to rotation of the optical disk. The light pulse RP for recording (non-crystallization or amorphous) is set at a high power amorphous level WH and a low power (crystallization) level WL, and the light pulse EP for erasure (crystallization) is set at a high power (crystallization) level EH and a low power (crystallization) level EL.

The amorphous points AP formed by the above recording pulses RP are independent of each other, that is, are overlapping, do not affect each other during formation and have approximately the same shape whether they are near or far from each other as shown. It is possible to variably set the time width (t and Tw-t) of each level. For example, when recording data in accordance with the reference clock (period: Tw) of the sample servo system, it is possible to record with little jitter, depending on the temperature characteristics of the laser driving circuit and fluctuation of rotation of the optical disk, by setting the time width (t and Tw-t) of each level to, for example, Tw/2.

FIG. 4 shows another example of power modulation of the laser beam. The light pulse for erasure has a high power level EH equal to the low power level EL. Amorphous points form three record marks within the time widths 1Tw, 4Tw and 1Tw, respectively. The high power level WH1 for all but the leading amorphous point AP of a record mark pulse train (of width 4Tw) and the low power level WL2 for the trailing amorphous point AP of the pulse train are set at values different from the high power level WH2 and the low-power level WL1, respectively, of all other amorphous points AP. Thereby, the amorphous points AP are formed with the same level temperature by keeping constant the heat remaining in the recording film and the cooling rate (slope from T1 to T2 the melting point of the medium) for forming all amorphous points AP. The crystallization temperature T3 is shown for reference.

Figure 5A:
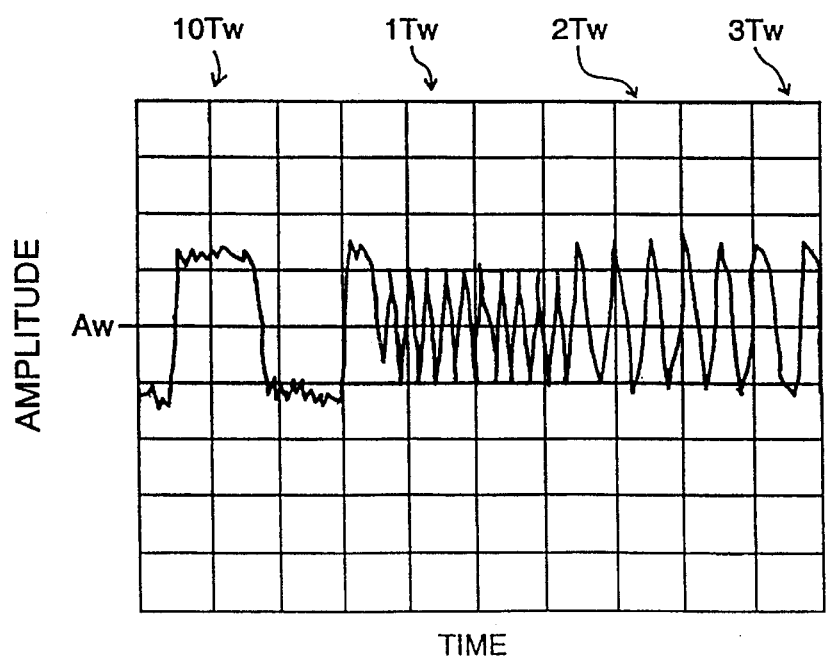
FIG. 5(a) displays an actual waveform of a reproduced signal, when the medium was recorded by a recording pulse like that shown in FIG. 4.

FIG. 5(a) is a reproduced signal of 1-Tw, 2-Tw, 3-Tw and 10Tw record marks with a duty of 50%. The maximum and minimum amplitudes of the reproduced signals are different between the record marks but the average amplitude values Av are almost equal. Therefore, the signals are discriminated with fewer errors by using the average values as slice levels for converting the analog values into digital binary values.

Figure 5B:
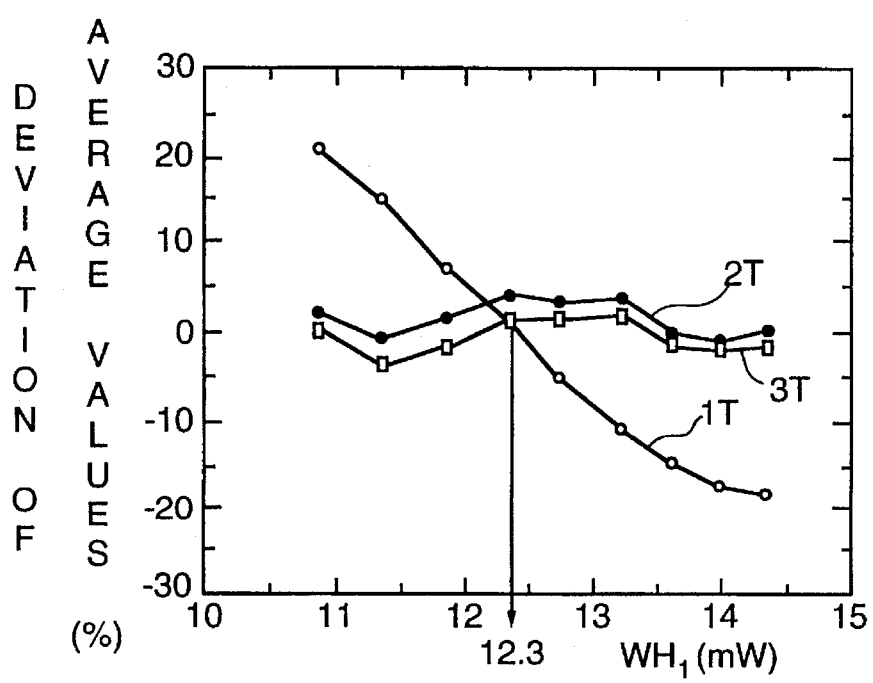
FIG. 5(b) is a graph showing setting the power of the recording pulse train.

FIG. 5(b) shows an example of the relation between the deviation of average values Av of 1-Tw, 2-Tw and 3-Tw record mark reproduced signals and the amorphous power level WH1 at the front end of the 1-Tw, 2-Tw and 3-Tw record pulse trains, when EH=EL=7.9 mW, WH2=13.3 mW, and WL1=WL2=1.5 mW. The medium comprised a discoid plastic substrate conforming to the sample servo format with a diameter of 5.25" and covered with a ZnS-20% SiO$_2$ dielectric protective film, a GeSbTe record film, a ZnS-20% SiO$_2$ dielectric protective film, an Al-3% Ti reflective film and a ZnS-20% dielectric protective film in multilayer. The medium was rotated at a constant speed of 1,800 rpm, recording 1-Tw, 2-Tw, 3-Tw and 10-Tw record marks as repetitive signals with a duty of 50% under the conditions of a linear velocity of approximately 7.5 m/s and a width Tw=90 ns, and thereafter measuring the deviation (%) of the average value Av of each of the 1Tw, 2Tw, and 3Tw signals from the average value Av of the 10Tw signal with the smallest average-value change. As shown in FIG. 5(b), the deviation of average values changes little, except for the 1-Tw signal, with respect to the value of WH1, and deviation of the average value Av is minimized when WH1 equals 12.3 mW. In this case, reproduced signals with the same average value Av and a large slice-level margin are obtained as shown in FIG. 5(a). It was confirmed through the observation of record films by an electron microscope that the sizes of the formed amorphous points were approximately equal and the formation of each amorphous point was spatially independent of the formation of other amorphous points. Therefore, modulating the irradiation laser power as shown in FIG. 4 makes the thermal interference during recording constant and is effective to record stable signals. The power level WL2 (FIG. 4) is a parameter effective to control the signal level at the rear end of each pulse train signal.

Figure 6:
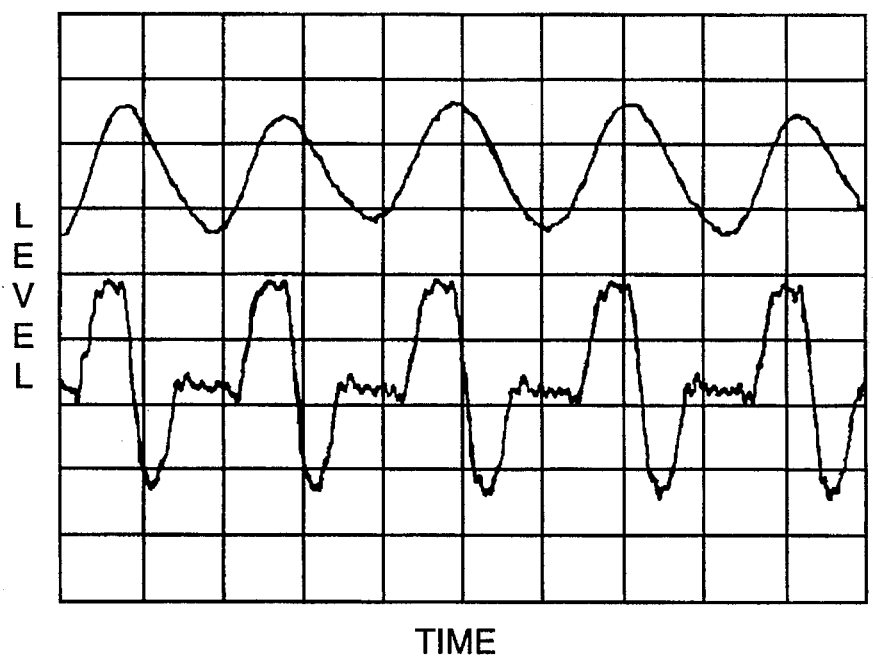
FIG. 6 shows a display of actual waveforms showing the optical modulation of laser beam power in recording and a corresponding reproduced signal.

FIG. 6 shows digital analyzer outputs of a repetitive pattern of a 1-Tw signal, in which the lower waveform represents the power level of the recording laser pulse and the time synchronized upper waveform represents the level of the reproduced signal.

Figure 7:
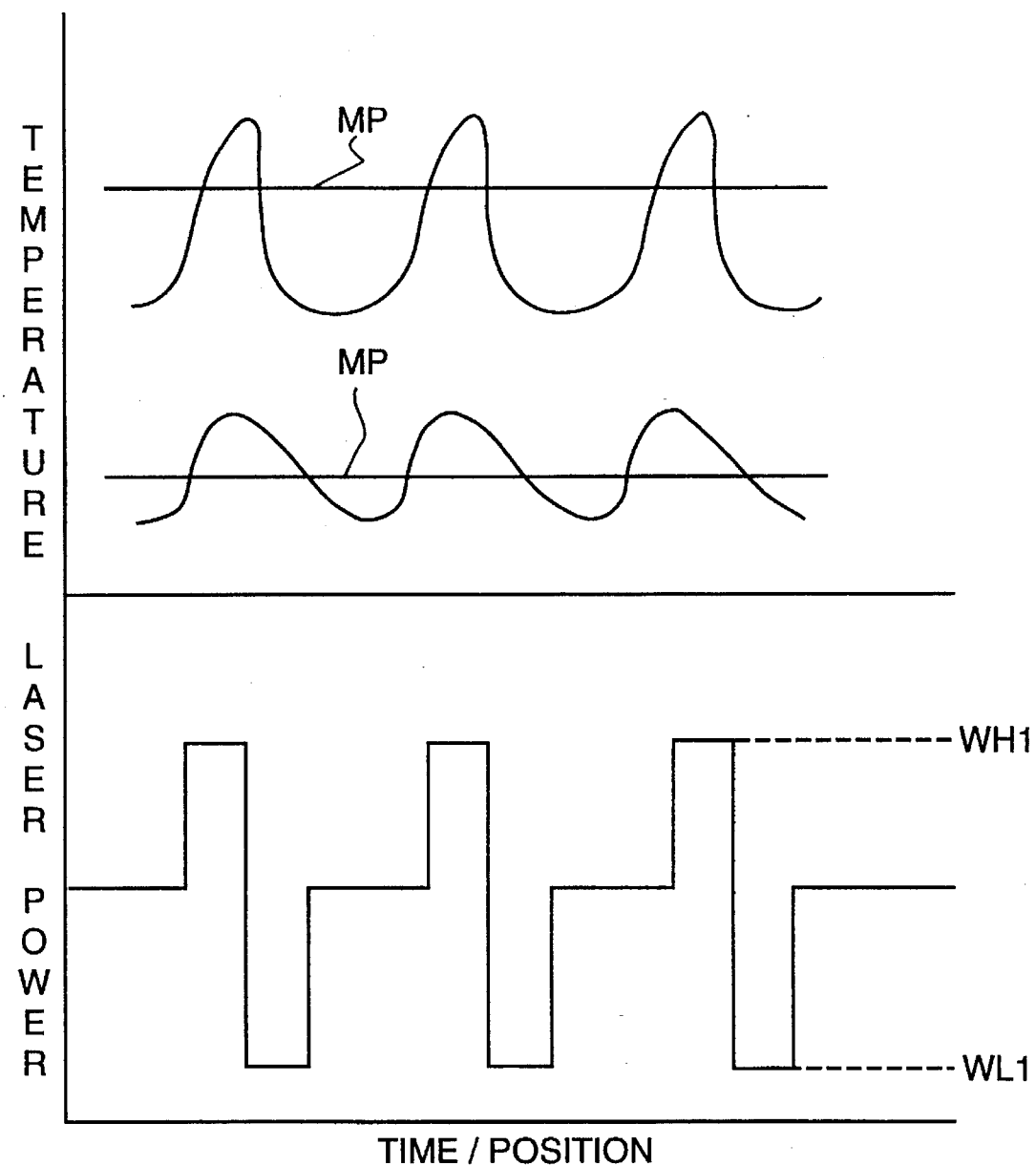
FIG. 7 illustrates the difference of ultimate-temperature distributions of a recording film related to the recording pulses, when the value of WH1/WL1 is large and small.

FIG. 7 shows the difference of the temperature distributions of a record film relative to the melting point MP, when the value of WH1/WL1 is large for the top waveform and small for the middle waveform for the lower power modulation shown as the lower waveform. As shown in FIG. 7, the temperature distribution in the record film, particularly the relation of magnitude of the heating rate (temperature rise per unit time) and that of the cooling rate (temperature drop per unit time) in the movement direction are reversed according to the value of WH1/WL1. Therefore, the stress applied to the record film due to the temperature distribution while it is melted must be changed. It was examined how the stress change influences the repetition life of the phase-change optical recording.

Figure 8:
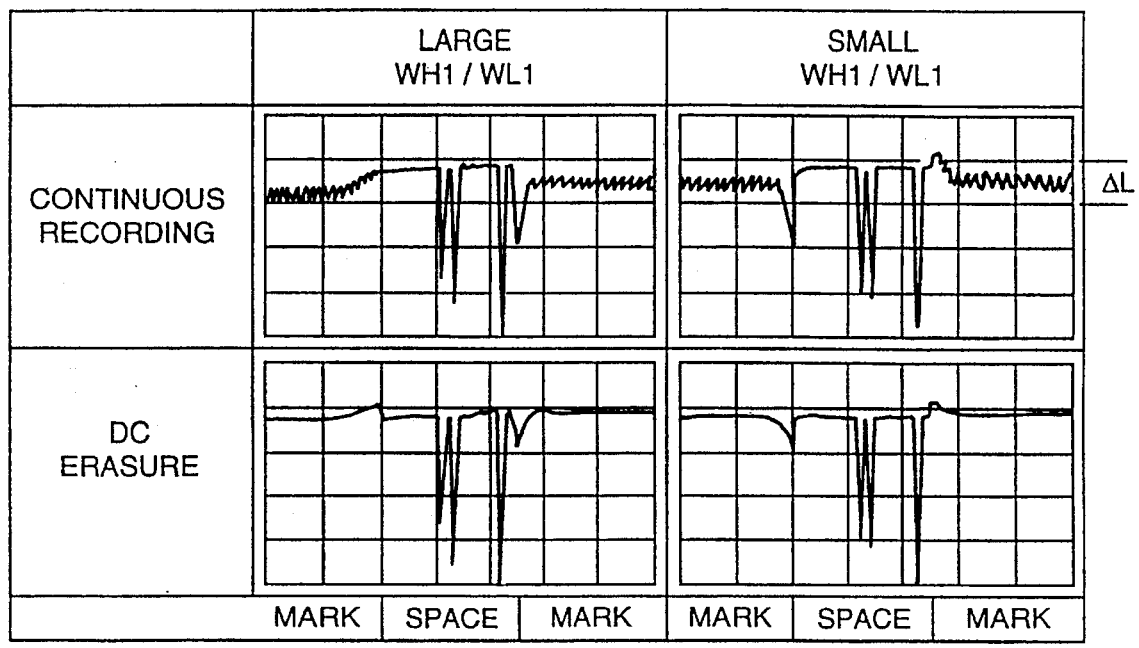
FIG. 8 displays actual digital analyzer waveforms showing reproduced signals after 10,000 repetitions of recording in the cases of WH1/WL1 being large and small, and reproduced signal waveforms after erasing the corresponding records with DC light.

FIG. 8 shows the end of one record mark and the start of another record mark, provided by WH1/WL1 being respectively small and large, for reproduced signals after a repetition of continuously recording a 1-Tw signal 10,000 times at the same location, and reproduced signals after the above recording was erased (crystallized) by DC light. The medium was as mentioned above, with a diameter of 5.25"

in a sample servo format. The sample marks in FIG. 8 were irradiated with only reproducing light, and have level displayed vs. time. The right ends of the sample marks correspond to the recording start parts and the left ends of the sample marks correspond to the recording end parts. FIG. 8 shows level changes ΔL of the reproduced signal that appeared between the recording start part and the recording end part. The direction change at the recording start part is opposite to the direction change at the recording end part because of the film thickness change due to the flow of the record film. Moreover, from the fact that the level change ΔL is reversed according to the value of WH1/WL1, positive for large WH1/WL1 to negative for small WH1/WL1, it is considered that this reversal depends on the asymmetry of the temperature distribution of the record film with respect to the light-beam traveling direction as shown in FIG. 7.

When the signal level changes at the start and end of a train of amorphous points as shown in FIG. 8, an error occurs in processing the reproduced signal and this error limits the number of recording repetitions. However, the direction of change (up or down, + to −) depends on the WH1/WL1 ratio, power of light applied being large or small. Therefore, repetitive recording life is lengthened by detecting the level change ΔL exceeding a reference value and when it does resetting the power of light applied so as to decrease the level change. It was confirmed that the reproduced-signal level change ΔL decreased by repeating recording while WH1/WL1 was low after repeating recording while WH1/WL1 was high. Therefore, it has been found that the above level change ΔL is reversible. Because the direction and magnitude of the reproduced-signal level change ΔL caused by repetitive recording in the recording start and end parts depends on the film constitution of the medium or the condition of thermal diffusion, the direction ± and magnitude of the level change ΔL for each medium is measured and recorded on the medium periodically to subsequently be fetched for power adjustment upon receipt of a new recording request.

Because the data to be recorded on an optical disk is normally random, the same signal is rarely recorded on the same place repeatedly. However, the directory area and the file management area in the FAT area of an MS-DOS format are only locally changed when rewritten and very similar patterns are recorded in rewriting. In the case of a phase-change recording medium, because the reproducing characteristics of unerased data and the degree of signal modulation change with the number of times of recording repetition (number of times melting to the amorphous point) as described with reference to FIG. 8, it is preferable that the file management area is made amorphous (non-crystallized) by approximately the same number of times independently of position. Therefore, the directory area and file management area record the same logic data by shifting the recording position for successive recordings as shown in FIG. 9.

Figure 9:
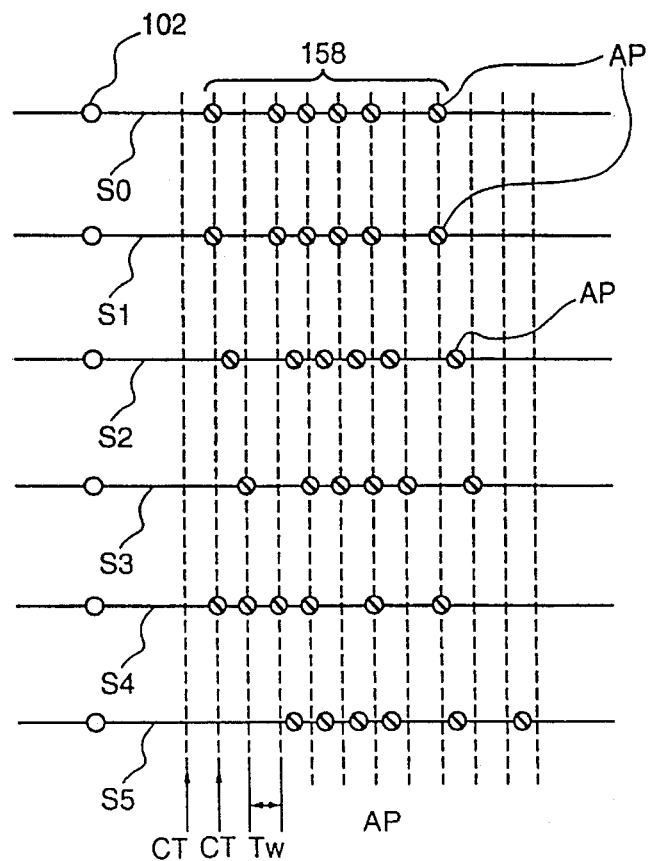
FIG. 9 shows a sequence of recording the same information with shiftings for improving the repetition life of a phase-change medium in the sample servo format.

FIG. 9 shows successively overwriting the same pattern of record data 158 as that of the initial signal $S_0$ in the sample servo system wherein there is a clock bit 102. Overwrite signals $S_1$ to $S_5$ have the same logic data as the initial signal $S_0$. In the case of overwrite signal $S_1$, amorphous points AP are formed in the very same positions as the positions of the initial signal $S_0$, that is there is no shift and the repetition of the record would rapidly deteriorate as shown by FIG. 8 if this were continued for successive repetitions. Therefore, in the case of the overwrite signals $S_2$ to $S_5$, data is shifted relative to $S_0$. The sample servo overwriting easily obtains a shift of an integral multiple or half-integral multiple of the reference clock period Tw with shift register 1431 in recording and correspondingly shifts the subsequent reproduced signal with shift register 1432 of FIG. 13. The overwrite signal $S_2$ is shifted by Tw/2, the overwrite signal $S_3$ is shifted by 2 Tw, the overwrite signal $S_4$ is logically rotated by 2 Tw and the overwrite signal $S_5$ is a combination of the shifting of signals $S_2$ to $S_4$, with the shifting being relative to the signal $S_0$. By recording such overwrite signals $S_2$ to $S_5$ in the same data area successively for each of a plurality of iterations, the physical amorphous-point AP forming positions become random for the same logical data in relationship to clock timing CT. The formatting efficiency is prevented from lowering by considering only physical shifting and rotation even though the size of a physical data area does not change.

Figure 2:
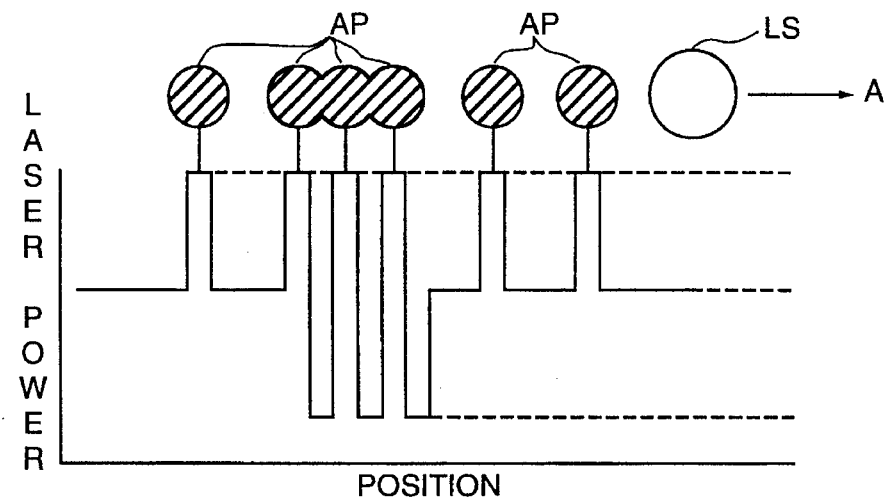
FIG. 2 is prior art and is useful in analyzing conventional recording.
Figure 10:
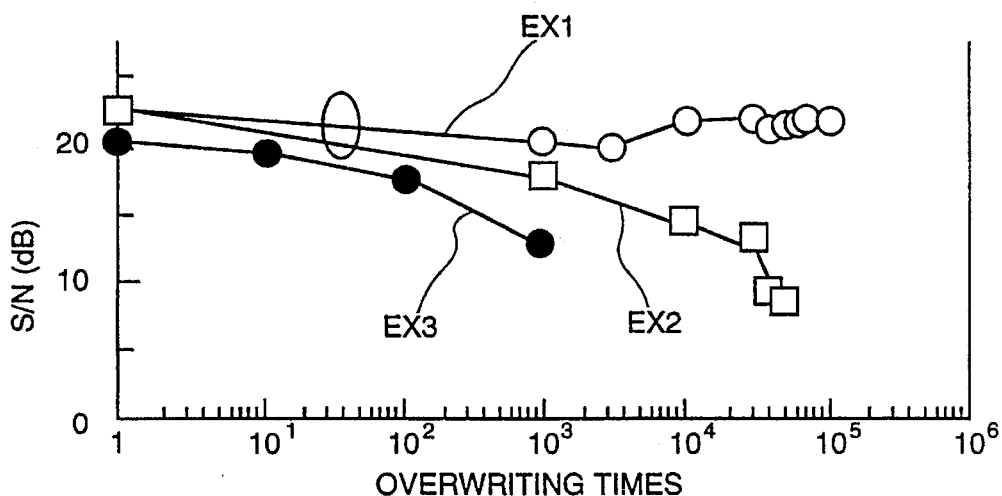
FIG. 10 is a graph showing the result of measuring the relation between the overwriting times according to various recording methods and the S/N ratio of reproduced signals.

FIG. 10 shows the result of measuring the relation between the overwriting times and the S/N ratio of a reproduced signal. By repeatedly recording the same logic data including 1-Tw to 10-Tw signals, it has been found that the recording of the present invention examples EX1 and EX2 for making amorphous points spatially independent is effective to improve the service life as compared to a prior art control example EX3 according to FIG. 2. When shifting a record pattern as in FIG. 9 for example EX1, the S/N ratio was not lowered due to repetition up to 100,000 times. In example EX1, the data pattern was shifted by using the integral multiple shift or rotation as in the case of the overwrite signal $S_4$ in FIG. 9 and changing the shift value each time in accordance with a table of random numbers.

Figure 11:
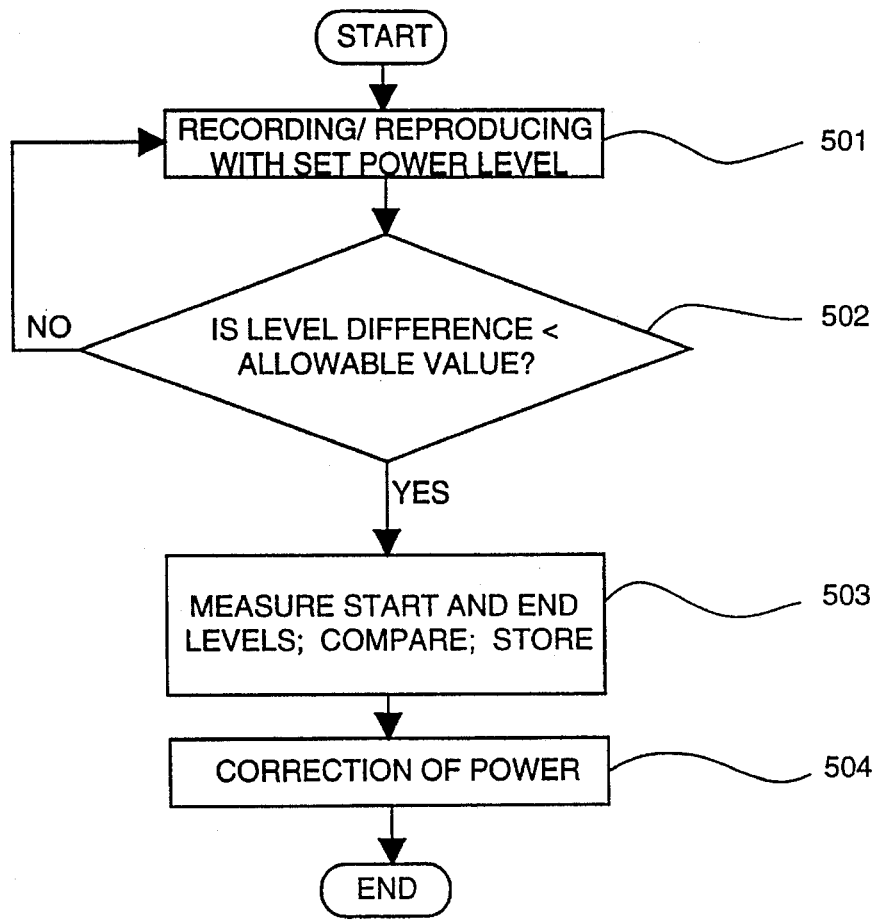
FIG. 11 is a flow chart showing power setting.

FIG. 11 shows setting recording power, preferable when loading a medium in the apparatus. For example, a signal is recorded with an initially-set power in a specific test recording area in each of the inner, middle and outer diameter parts of the recording medium (501) and the power is corrected by using the relation between recording power and average level of signal shown in FIG. 5(a), so that the signal average level Av difference between the longest (e.g. 10 Tw) and shortest (e.g. 1 Tw) of the reproduced signals is below a predetermined allowable value (502) to optimize the S/N. Then, the level changes ΔL of the reproduced signals from the recording start and end parts are measured by using the relation shown in FIG. 8, and the direction of and value of ΔL are stored on the medium (503). A judgment on correction of temperature distribution symmetry is made according to ΔL, and the power is corrected so as to decrease the difference (504); steps 503 and 504 provide prevention of and recovery from repetitive recording deterioration. Because the direction of a level change ΔL of the reproduced signal level from the recording start to end part due to repetitive recording depends on the film constitution of a medium and the condition of thermal diffusion, the direction of and value of ΔL are measured and recorded for each medium constitution. The measurement of reflectance changes for the reproduced signal of the recording start and end parts for every recording causes overhead and thereby the effective transfer rate decreases. Therefore, to minimize the overhead, the reflectance changes of the recording start and end parts of every sector are measured and the measurement result is recorded in the sector management area when there is no recording or reproduction instruction. Then upon a subsequent recording or reproduction instruction, the measurement result is retrieved from storage and used in correcting the power for execution of such instruction.

Figure 12:
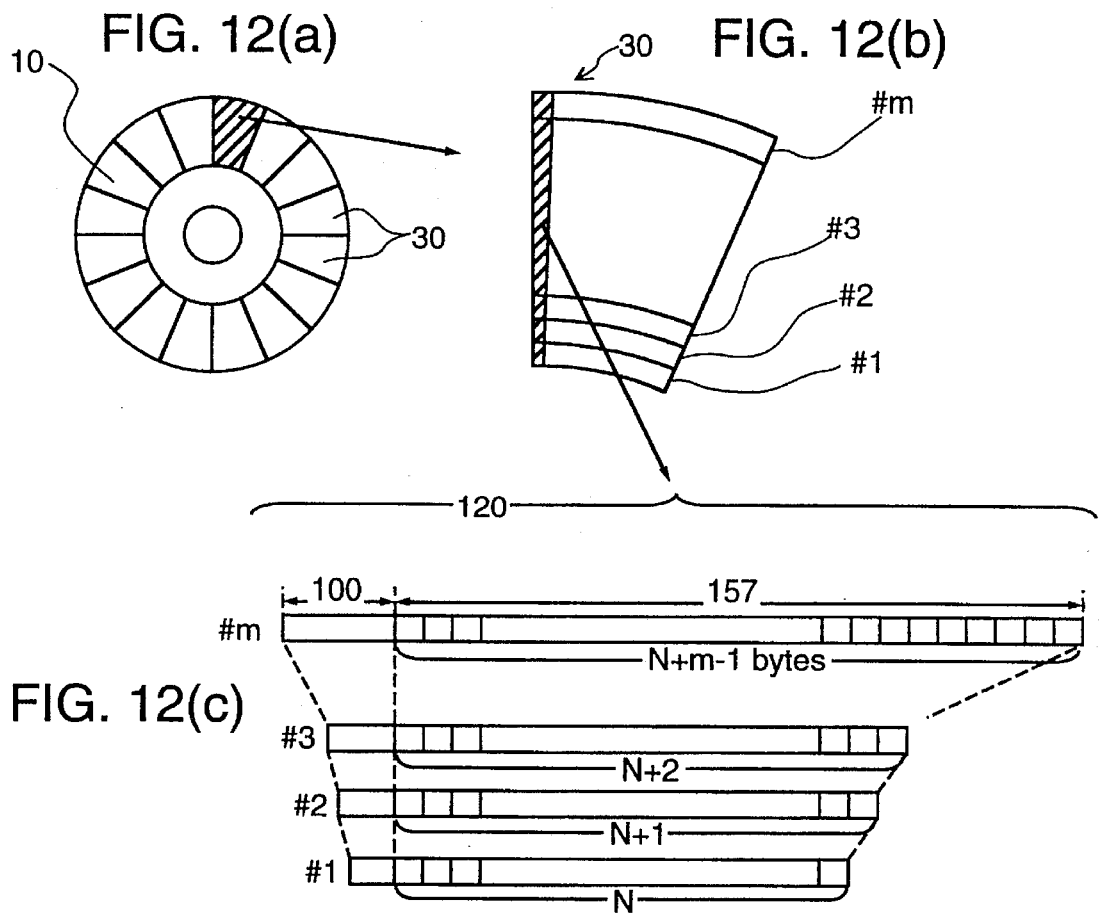
FIGS. 12(a), (b), (c) are a schematic top view, an enlarged portion thereof and further enlarged portion thereof of a medium suitable for the present invention.
Figure 13:
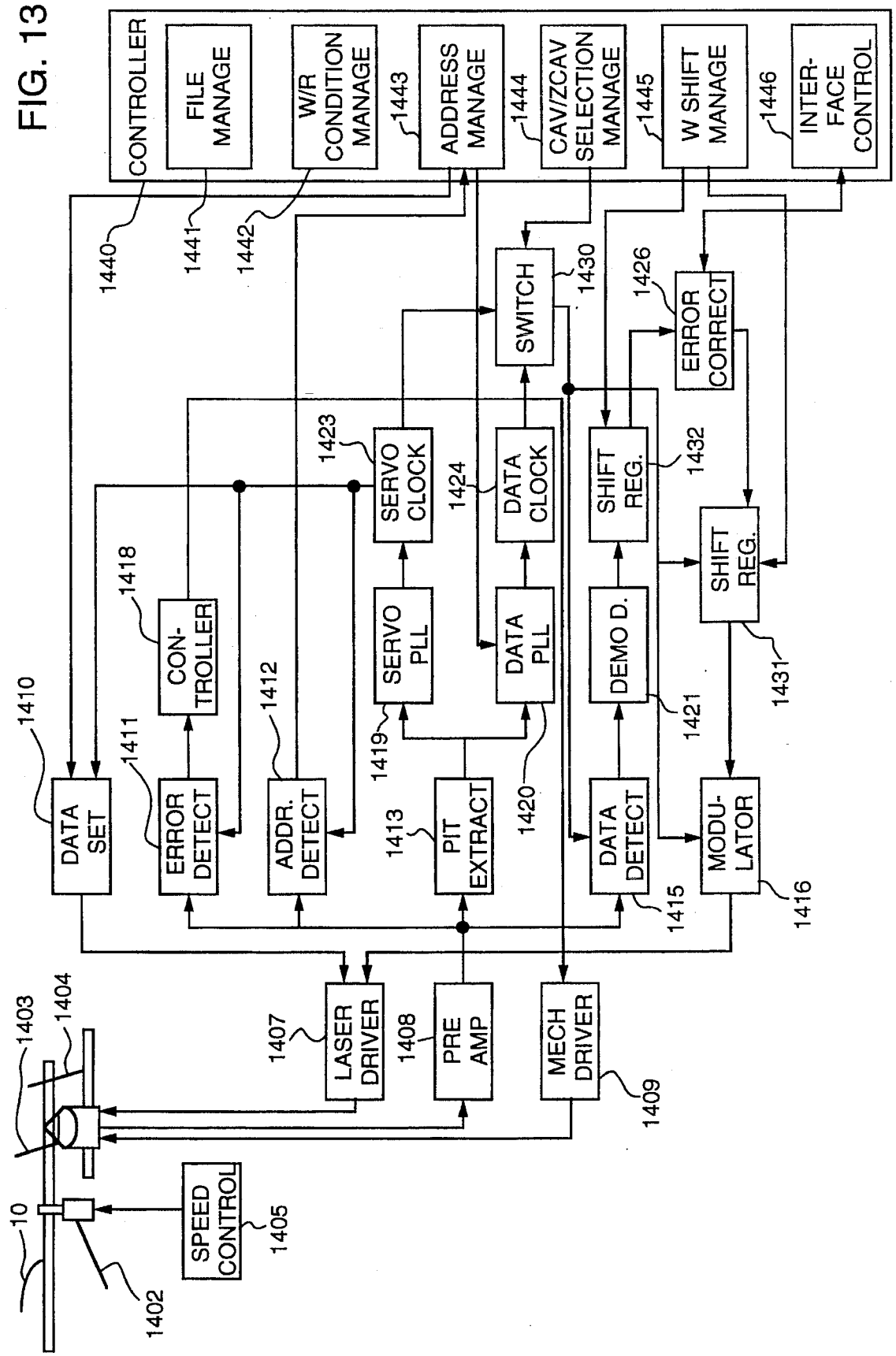
FIG. 13 is a circuit block diagram of the optical disk drive.

FIGS. 12(a)–(c) show an optical disk medium 10 recorded in a data area 157 in accordance with the CAV (Constant Angular Velocity) format by using the sample servo clock 1423 of FIG. 13. In the case of the ZCAV (Zoned Constant Angular Velocity) format of FIG. 21(b) using the data clock 1424, the access speed is high because the rotational speed of the optical disk medium 10 is constant and the disk capacity can be increased because the linear density of recorded information is approximately constant for each zone. In the case of the CAV format, the optical system is simplified and the apparatus can be downsized because data, focus error, and tracking error are detected in time division in accordance with the fixed period reference clock 1423. Header, servo and ECC (Error Correction Code) areas are also shown.

The PLL (Phase Locked Loop) circuit for generating the clock is divided into two sections: one for servo (1419 and 1423 of FIG. 13) and the other for data (1420 and 1424 of FIG. 13). A servo mark 100 comprising a clock pit and wobble pit preformatted in the optical disk medium 10 is radially arranged for the ZCAV format as in the CAV format. The PLL 1419 for servo is constructed so that the frequency is constant in order to reproduce the servo mark 100 and generate focus-error and tracking-error signals. The PLL 1420 for data is constructed so that the frequency increases approximately in proportion to the radius of the optical disk medium 10 in order to provide a recording density that is approximately constant both in inner and outer parts of the optical disc medium 10. Thereby, the servo system and the data recording/reproducing system become independent of each other and it is possible to record/reproduce data in the ZCAV mode on/from the optical disk medium 10 preformatted in accordance with the CAV method.

In the ZCAV data format, signals recorded on the optical disk medium have a larger capacity per segment 120 from inner to outer tracks of the medium 10 as shown in FIG. 12(c). The information of N bytes per segment 120 is recorded in the innermost zone #1 and the whole area is divided into m zones. The number of bytes per segment 120 of a sector 30 increases with an increment of one byte from inner to outer tracks for zones #1, #2, #3 to outer track zone #m and becomes "N+m−1" at the outermost zone. The medium 10 is used for data recording conforming to the ZCAV format or data recording conforming to the CAV format according to the CAV/ZCAV selection management 1444 of switch 1430 (FIG. 13) to select one of the clocks 1423 or 1424 for data even though the medium 10 is basically preformatted in accordance with the CAV format.

FIG. 13 shows the optical disk drive circuit. A laser driver 1407 turns on the semiconductor laser of an optical head 1403 and projects the reproducing light onto optical disk medium 10, that is driven by a spindle motor 1402 under control of a rotational speed controlling section 1405. The optical head 1403 is radially moved by a coarse actuator 1404. Light reflected from the optical disk medium 10 is converted into electric information by a photosensor in the optical head 1403, the electric information is amplified by a preamplifier 1408, and the pit extracting section 1413 reproduces the information recorded in the optical disk medium as RF signals. The output of the preamplifier 1408 is sent to the error detecting section 1411, the address detecting section 1412 and to the data detecting section 1415. The pit extracting section 1413 extracts the bits from the amplitude pattern of the RF signal to reproduce the reference clock of the servo system by a servo-system PLL 1419 and a servo clock 1423. For the servo-system PLL 1419, the number of divisions in a feedback loop is fixed to generate the reference clock with a fixed frequency. The laser driver receives input from the data area setting section 1410 and modulator 1416. The laser driver 1407 reproduces servo signals for focus and tracking, and addresses of preformatted tracks and sectors on the basis of the reference clock. The servo error detecting section 1411 determines deviations for focus control and tracking control from the servo clock signal and information from preamplifier 1408 by time division calculation. A controller 1418 controls the focus and tracking of the two-dimension actuator in the optical head 1403 through a mechanism driver 1409 so that these deviations become zero.

The reference clock of the data system is generated from the reproduced RF signal from the pit extracting section 1413 by a data system PLL 1420 and a data clock 1424 to record/reproduce data by modulating the data on the basis of the reference clock. The oscillation frequency of the data system PLL 1420 changes for each zone under control of a signal from the controller 1440 indicating the radial zone so that the data recording density becomes approximately constant. Therefore, the number of divisions in the feedback loop of the data PLL changes for each zone.

The Reproduced signal from preamplifier 1408 is fed to the data detecting section, and an extracted data signal is demodulated by the demodulating section 1421. Demodulated reproduced data from demodulator 1421 held in shift register 1432 are subjected to error correction processing and interleaving processing by an error correcting section 1426 whose output is held in shift register 1431. Shift registers 1431, 1432 are controlled by shift management section 1445. Record or reproduced data is transferred from and to the host computer through an interface controlling section 1446.

The operation of a drive controller 1418 is controlled by a built-in microprocessor. By using the reference servo clock 1423 of the servo system as the reference clock of the data system as selected by switch 1430, it is possible to record and reproduce conforming to the CAV method. The recording and reproducing conforming to the ZCAV method can be obtained by selecting the data clock 1424 with selector switch 1430.

The sector addresses are preformatted and the capacity per physical sector increases from inner to outer tracks. For a personal computer, it is currently preferable that a logic sector is constantly 512 or 1,024 bytes. An address management section 1443 converts a physical sector which changes for each zone (ZCAV format) into a fixed-length logic sector (CAV format).

A controller 1440 controls all the functions of the apparatus, and includes a file managing section 1441, a record/reproduction (W/R) condition managing section 1442 for performing test recording and power setting, an address managing section 1443, a CAV/ZCAV selection managing section 1444 to control clock selection through switch 1430, a recording (W) shift managing section 1445 for determining the shift value of record data and for recording/reproducing data, and interface managing section 1446.

FIG. 14 shows a CAV format applied to a sample servo, mark length recording and level detection with rotation of an optical disk for personal computers having a disk diameter of 64 mm (inside diameter of data area 16 mm and outside diameter of data area 30.5 mm) and a disk substrate thickness of 0.6 mm. One side of the disk has a storage capacity of 144 MB by adopting an 8–10 modulation method, and setting the rotational speed at 3,600 rpm, the number of tracks at 10,720, the track pitch at 1.35 μm, the shortest mark length at 0.7 μm, the number of sectors at 20 per track and the number of zones at 10. Recording frequency is 8.57 to 15.0 MHz and the transfer rate is 0.82 to 1.43 MB/S (head reading).

Figure 15:
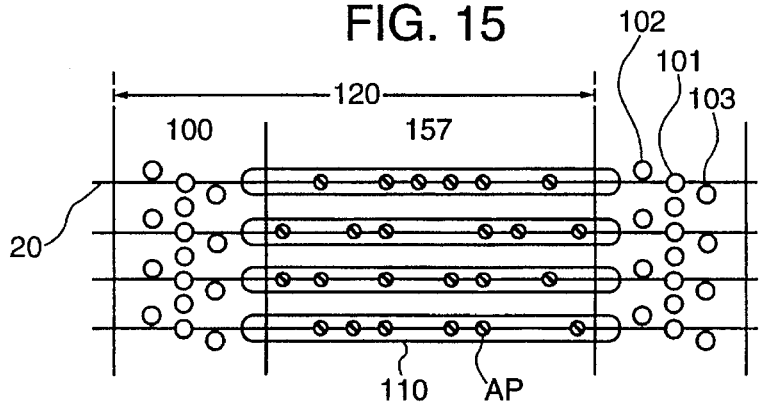
FIGS. 15–20 are top views of example servo and data areas of the optical disk medium.

FIG. 15 is an example of the servo and the data area of an optical disk medium. A phase-change optical recording film deteriorates due to repetitive recording because of the flow of the recording film. Therefore, when there is a structure such as a groove in the recording area, the service life can be improved because the groove serves as a resistance against such flow. Grooves 110 are formed in a data area 157 in a segment 120. Thereby, the repetition life of the data part is improved and the grooves do not influence the reproduced signals of a clock pit 101 and wobble pits 102 and 103 in reproducing a servo mark 100. Amorphous points AP are formed in the grooves 110 as data. To simplify the process for fabricating a substrate, it is preferable to equalize the depth of the pits with that of the grooves. The modulation degree of a reproduced signal of a pit is maximized when the depth is equal to ¼ the wavelength of a reproducing laser beam. In this case, however, the reflectance of the grooves is minimized and the S/N of record data decreases. Therefore, it is preferable to equalize the depth of the pits with that of the grooves by maintaining the depth of ¼ or less of the wavelength of the reproducing laser beam.

Figure 16:
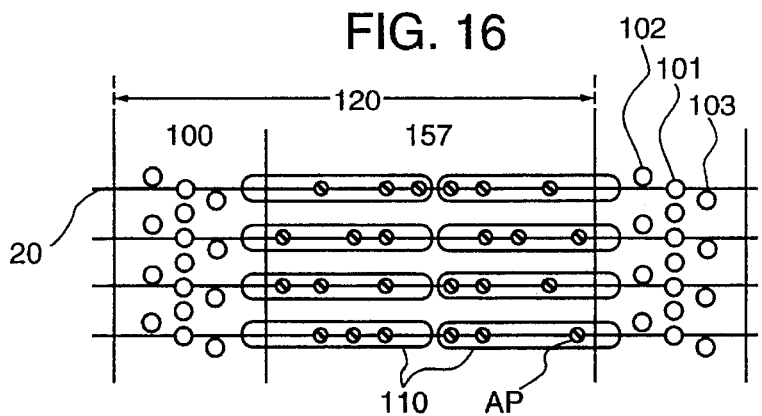

FIG. 16 shows another example of the servo and the data areas of the optical disk medium. In this example, the grooves 110 of the example of FIG. 15 are halved in the data area. Thereby, the resistance to the flow between grooves increases in the direction along the tracks 20 and the effect for controlling the flow is improved. By increasing the number of grooves in the data area to 3 or more, the effect is further improved.

Figure 17:
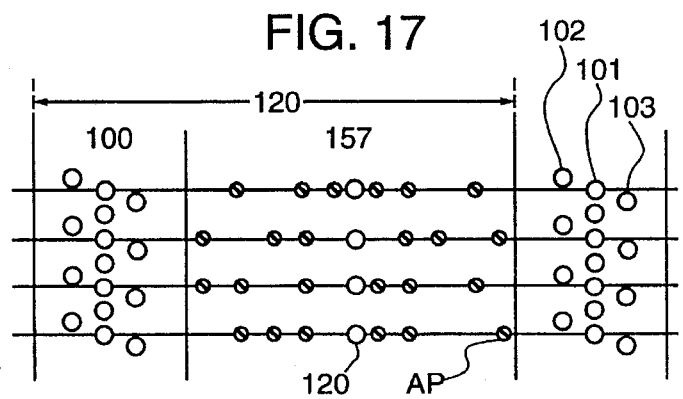

FIG. 17 shows still another example of the servo and the data area of the optical disk medium. In this example, data area pits 120 are formed instead of grooves to prevent flow. It is obvious that the flow preventive effect is further improved by increasing the number of pits. Moreover, by arranging the pits 120 synchronously with the data recording frequency in the ZCAV recording, the stability of the PLL for data is increased and recording with less jitter is realized.

Figure 18:
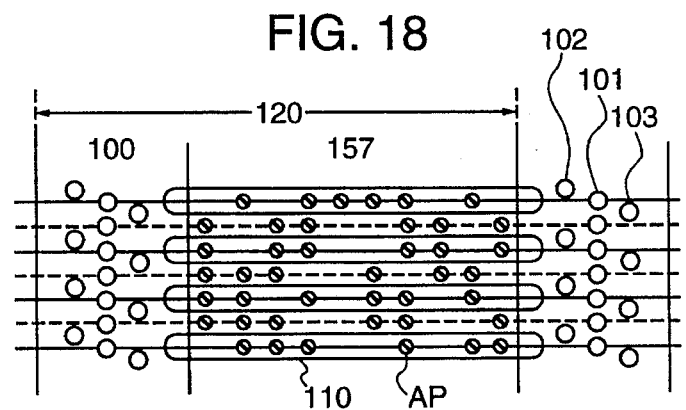

FIG. 18 shows still another example of the servo and the data areas of the optical disk medium. In this example, data is recorded not only in the grooves 110 but also in the areas between the grooves. In the case of the phase-change optical recording, it is known that there is a crosstalk control effect if the depth of the grooves ranges from ⅛ to ⅙ the wavelength of the reproducing laser beam even when data is recorded in the grooves and areas between the grooves at the same time. The effect is applied to this example. This example is characterized in that the clock pits 101 at the center of an even-numbered track 22 with a groove formed and the center of an odd-numbered track 21 with no groove. Thereby, it is possible to apply a light beam to both tracks by inverting the polarity for generating a tracking error signal from the wobble pits 102 and 103.

Figure 19:
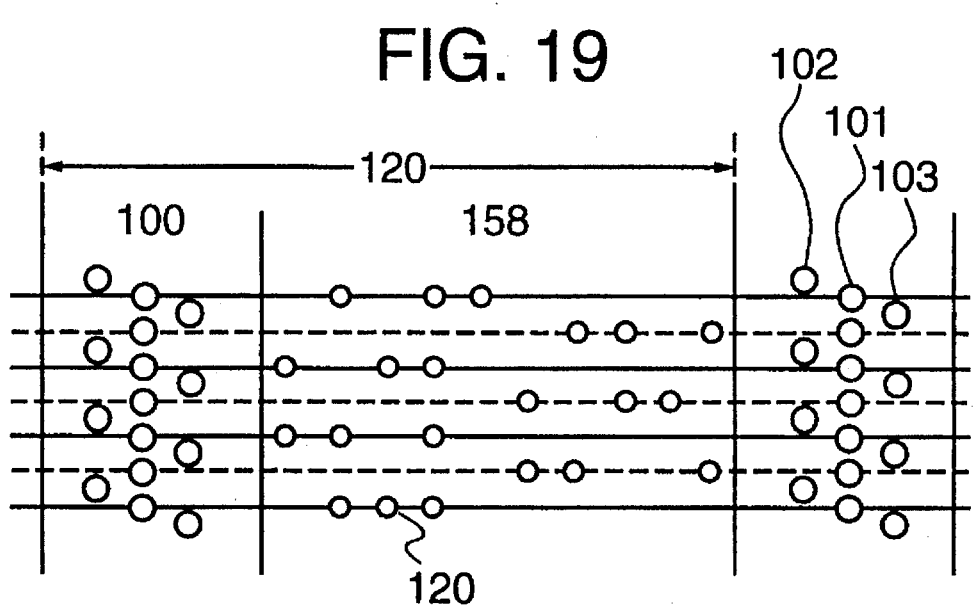

FIG. 19 shows still another example of the servo and the data area of the optical disk medium. This example shows the header area preformatted in the example in FIG. 18. The header area comprising pit trains does not have the crosstalk control effect of grooves like a phase change signal. In the case of this example, any reproduction error due to crosstalk is prevented by dividing the header area into front and rear parts and forming header information of the even-numbered track 22 in the front part and the header information of the odd-numbered track 21 in the rear part. It is also possible to reduce header information in every other track, that is, only in even-numbered tracks or only in odd-numbered tracks.

Figure 20:
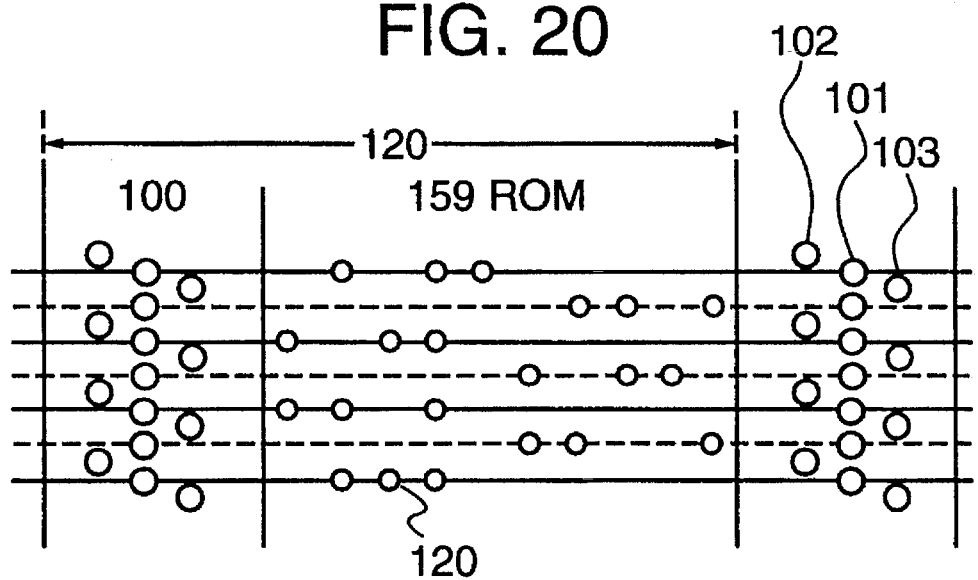

FIG. 20 shows still another example of the servo area and the data area of the optical disk medium. In this example, the method for forming the header area preformatted in the example in FIG. 19 is used in recording ROM data information. The function and advantage are the same as those of the header area. It is also possible to record the ROM information in every other track, that is, only in even-numbered tracks or only in odd-numbered tracks.

Figure 21A:
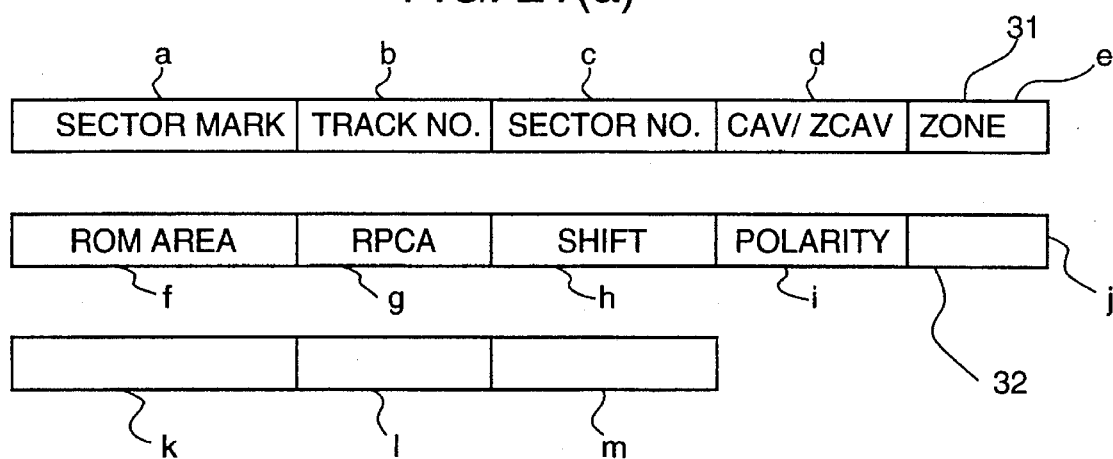
FIGS. 21 (a) and (b) show the logic ZCAV format of the optical disk medium.
Figure 21B:
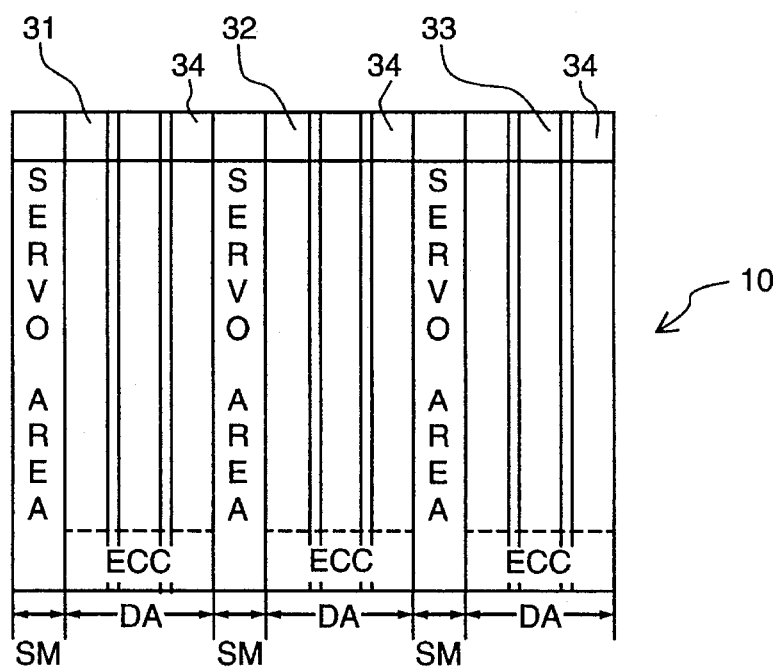

FIG. 21(b) shows the logic format of the optical disk medium. A segment with a data area DA of 12 bytes for a sample mark SM of 2 bytes is provided. The user capacity is 512 bytes by forming each sector with 51 segments. An ECC has 72 bytes and a header has 24 bytes. A data clock 34 is provided. The information recorded in a first header 31 and a second header 32 includes sector mark a, track No. b, sector No. c, CAV/ZCAV switching information or indicator d, zone information e, track polarity information i, recording power correcting area (RPCA) g, ROM area indicator f, record clock shift correction (SHIFT) h, and so on.(j–m) as shown in FIG. 21(a). Moreover, the record shift information and the information about the difference of the level between reproduced signals recorded on the recording start and end parts for recording the record life are recorded in the control information area 33 of the user area along with test information and repetition deterioration information, according to the ZCAV method. The servo area records focus, tracking and clock information.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

We claim:

1. An optical information recording apparatus for recording information, comprising:

a phase change optical information recording medium;

an optical system for irradiating the recording medium with a pulse width modulated light beam including a high powered recording light pulse and a lower powered nonrecording light pulse;

a drive system for relatively rotating the recording medium and irradiating the modulated light beam on predetermined tracks at a relative speed of v;

a plurality of record marks on said recording medium, each record mark having a spatial length of N×L and being readable by the light beam to effectively produce a single level reproduced signal, wherein N is a positive integer;

some of said record marks each being a train of N (N>1) spatially independent record amorphous points that are spaced at a minimum distance L and spaced from each other sufficiently that they do not overlap, and each amorphous point having a length less than L;

wherein L is equal to a beam time width Tw×v; and each record mark consisting of N pairs of the amorphous point on the recording medium caused by the high powered recording light pulse with a time width of t and a space caused by the lower powered recording light pulse with a time length of Tw-t.

2. An information recording method, comprising the steps of:

relatively moving a phase change optical information recording medium and an irradiating energy beam;

generating a record mark of N amorphous points on the recording medium by irradiating the recording medium with N pairs of a high power recording pulse of the beam and a lower power recording pulse of the beam to change a state of N points on the recording medium by thermal energy sufficiently to impart information to be subsequently discriminated by irradiating the recording medium with a reading beam;

erasing a record mark on the recording medium by irradiating the record medium with N pairs of a high power erasing pulse of the beam and a lower power erasing pulse of the beam to change a state of N points on the recording medium by thermal energy sufficiently to erase the information; and controlling power of said pulses during said generating and erasing so that WH/WL>EH/EL when T1 is greater than T2, and so that WH/WL<EH/EL when T1 is less than T2, where intensity of the high power recording pulse is WH and sufficient to form an amorphous point, intensity of the lower power recording pulse is WL and insufficient to form an amorphous point, intensity for the high power erasing pulse is EH and is sufficient to crystallize an amorphous point, intensity for the lower power erasing pulse is EL, the maximum temperature for generating the record mark is T1, and the maximum temperature for erasing the record mark is T2.

3. An information recording method according to claim 2, wherein moving is with respect to a laser beam as said beam.

4. An information recording method according to claim 3, wherein said controlling is conducted so that the beam reversibly phase changes a spot on the recording medium for each record mark between crystalline and amorphous states for recording and erasing, including rewriting.

5. An information recording method according to claim 4, controlling power of said pulses during said generating and said erasing so that integration of power per pulse of WH and WL with respect to time substantially equals the integration of power of EH and EL with respect to time, so that recording sensitivity and control of thermal interference of record marks is independent of whether a preceding pulse is said recording pulse or said erasing pulse and so that a temperature of the recording medium is approximately constant at an irradiating start position of pulses of a pulse train independently of the preceding pulse, wherein intensity of the high power recording pulse is WH and sufficient to form an amorphous point, intensity of the lower power light recording pulse is WL and insufficient to form an amorphous point, intensity for the high power erasing pulse is EH and is sufficient to crystallize an amorphous point, and intensity for the lower power erasing pulse is EL.

6. An information recording method according to claim 4, wherein the step of controlling the power of said recording pulses during said generating is performed so that a high power level WH1 for all but a leading amorphous point of a record mark pulse train of N≧2 is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point, wherein WH1 is greater than WH2.

7. An information recording method according to claim 4, wherein the step of controlling power of said pulses during said generating is performed so that a low power level WL1 for all but a trailing amorphous point of a record mark pulse train of N≧2 is set at a value different from a low power level WL2 of the trailing amorphous point in the train, so that the amorphous points are formed with a fixed maximum temperature for keeping constant heat remaining in the recording medium and keeping constant a cooling rate for forming all amorphous points in the train, and wherein each low power level WL1 and WL2 is insufficient to form or erase an amorphous point, wherein WL2 is greater than WL1.

8. An information recording method according to claim 7, wherein the step of controlling the power of said recording pulses during said generating is performed so that a high power level WH1 for all but a leading amorphous point of a record mark pulse train of N≧2 is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point, wherein WH1 is greater than WH2.

9. An information recording method according to claim 8, wherein the step of controlling power of said pulses during said generating and said erasing is performed so that integration of power per pulse of WH and WL with respect to time substantially equals the integration of power of EH and EL with respect to time, so that recording sensitivity and control of thermal interference of record marks is independent of whether a preceding pulse is said recording pulse or said erasing pulse and so that a temperature of the recording medium is approximately constant at an irradiating start position of pulses of a pulse train independently of the preceding pulse, wherein intensity of the high power recording pulse is WH and sufficient to form an amorphous point, intensity of the lower power light recording pulse is WL and insufficient to form an amorphous point, intensity for the high power erasing pulse is EH and is sufficient to crystallize an amorphous point, and intensity for the lower power erasing pulse is EL.

10. An information recording method according to claim 4, wherein said step of generating a record mark by irradiating the recording medium is performed so that a time width of the high power recording pulse is substantially equal to a time width of the lower power recording pulse.

11. An information recording method, comprising the steps of:

relatively moving a phase change information recording medium and an irradiating energy beam;

generating a record mark of N amorphous points on the recording medium by irradiating the recording medium with N pairs of a high power recording pulse of the beam and a lower power recording pulse of the beam to change a state of N points on the recording medium by thermal energy sufficiently to impart information to be subsequently discriminated by irradiating the recording medium with a reading beam;

erasing a record mark on the recording medium by irradiating the recording medium with N pairs of a high power erasing pulse of the beam and a lower power erasing pulse to change a state of N points on the recording medium by thermal energy sufficiently to erase the information; and controlling power of said pulses during said generating and erasing so that integration of power per pulse of WH and WL with respect to time substantially equals integration of power of EH and EL with respect to time, so that recording sensitivity and control of thermal interference of record marks is independent of whether a preceding pulse is said recording pulse or said erasing pulse and so that a temperature of the recording medium is approximately constant at an irradiating start position of pulses of a pulse train independently of a preceding pulse, wherein intensity of the high power recording pulse is WH and sufficient to form an amorphous point, intensity of the lower power recording pulse is WL and insufficient to form an amorphous point, intensity for the high power erasing light pulse is EH and is sufficient to crystallize an amorphous point, and intensity for the lower power erasing pulse is EL.

12. An information recording method according to claim 11, wherein said controlling is conducted so that the beam reversibly phase changes a spot on the recording medium for each record mark between crystalline and amorphous states for recording and erasing, including rewriting.

13. An information recording method according to claim 12, wherein moving is with respect to a laser beam as said beam.

14. An information recording method according to claim 13, wherein the step of controlling power of said pulses during said generating is performed so that a low power level WL1 for all but a trailing amorphous point of a record mark pulse train of N≧2 is set at a value different from a low power level WL2 of the trailing amorphous point in the train, so that the amorphous points are formed with a fixed maximum temperature for keeping constant heat remaining in the recording medium and keeping constant a cooling rate for forming all amorphous points in the train, and wherein each low power level WL1 and WL2 is insufficient to form or erase an amorphous point, wherein WL2 is greater than WL1.

15. An information recording method according to claim 14, wherein the step of controlling the power of said recording pulses during said generating is performed so that a high power level WH1 for all but a leading amorphous point of a record mark pulse train of N≧2 is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point, wherein WH1 is greater than WH2.

16. An information recording method according to claim 13, controlling the power of said recording pulses during said generating so that a high power level WH1 for all but a leading amorphous point of a record mark pulse train of N≧2 is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point, wherein WH1 is greater than WH2.

17. An information recording method according to claim 13, wherein said step of generating a record mark by irradiating the recording medium is performed so that a time width of the high power recording pulse is substantially equal to a time width of the lower power recording pulse.

18. An information recording method, comprising the steps of:

relatively moving a phase change information recording medium and an irradiating energy beam;

generating a record mark of N amorphous points on the recording medium by irradiating the recording medium with high power recording pulses of the beam to change a state of N points on the recording medium by thermal energy sufficiently to impart information to be subsequently discriminated by irradiating the recording medium with a reading beam; and controlling power of said recording pulses during said generating so that a high power level WH1 for all but a leading amorphous point of a record mark pulse train of N≧2 is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point.

19. An information recording method according to claim 18, wherein moving is with respect to a laser beam as said beam; and wherein said controlling is conducted so that the beam reversibly phase changes a spot on the recording medium for each record mark between crystalline and amorphous states for recording and erasing, including rewriting.

20. An information recording method according to claim 19, wherein WH1 is greater than WH2.

21. An information recording method according to claim 19, wherein said step of generating a record mark by irradiating the recording medium is performed so that a time width of the high power recording pulse is substantially equal to a time width of the lower power recording pulse.

22. An information recording method, comprising the steps of:

relatively moving a phase change information recording medium and an irradiating energy beam;

generating a record mark of N amorphous points on the recording medium by irradiating the recording medium with N pairs of a high power recording pulse of the beam and a lower power recording pulse of the beam to change a state of N points on the recording medium by thermal energy sufficiently to impart information to be subsequently discriminated by irradiating the recording medium with a reading light beam; and controlling power of said pulses during said generating so that a low power level WL1 for all but a trailing amorphous point of a record mark pulse train of N≧2 is set at a value different from a low power level WL2 of the trailing amorphous point in the train, so that the amorphous points are formed with a fixed maximum temperature for keeping constant heat remaining in the recording medium and keeping constant a cooling rate for forming all amorphous points in the train, and wherein each low power level WL1 and WL2 is insufficient to form or erase an amorphous point.

23. An information recording method according to claim 22, wherein moving is with respect to a laser beam as said beam; and wherein said controlling is conducted so that the beam reversibly phase changes a spot on the recording medium for each record mark between crystalline and amorphous states for recording and erasing, including rewriting.

24. An information recording method according to claim 23, wherein WL2 is greater than WL1.

25. An information recording method according to claim 23, wherein said step of generating a record mark by irradiating the recording medium is performed so that a time width of the high power recording pulse is substantially equal to a time width of the lower power recording pulse.

26. An information recording method according to claim 25, wherein said erasing is performed so that a time width of the high power erasing pulse is substantially equal to the time width of the lower power erasing pulse.

27. An information recording method according to claim 22, further comprising the steps of:

controlling the power of said recording pulses during said generating so that a high power level WH1 for all but a leading amorphous point of a record mark pulse train of $N \geq 2$ is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point.

28. An information recording method according to claim 27, wherein moving is with respect to a laser beam as said beam; and wherein said controlling is conducted so that the beam reversibly phase changes a spot on the recording medium for each record mark between crystalline and amorphous states for recording and erasing, including rewriting.

29. An information recording method according to claim 28, wherein WL2 is greater than WL1 and WH1 is greater than WH2.

30. An information recording method, comprising the steps of:

relatively moving a phase change information recording medium and an irradiating energy beam;

generating a record mark of N amorphous points on the recording medium by irradiating the recording medium with high power recording pulses of the beam so that said beam reversibly phase changes a spot on the recording medium for each record mark between crystalline and amorphous states for recording and erasing, including rewriting, to change a state of N points on the recording medium by thermal energy sufficiently to impart information to be subsequently discriminated by irradiating the recording medium with a reading beam;

periodically detecting a level of power change between a start of a reproduced signal and an end of the reproduced signal for the record mark comprising a train of amorphous points and storing a result based on the power change; and changing a maximum power level setting of the high power recording pulse in response to said result.

31. An information recording method according to claim 30, wherein moving is with respect to a laser beam as said beam.

32. An information recording method according to claim 31, wherein said step of generating a record mark is performed by irradiating the recording medium with N pairs of the high power recording pulses of the beam and a lower power recording pulse; and wherein the method further comprises the step of controlling power of said pulses during said generating so that a low power level WL1 for all but a trailing amorphous point of a record mark pulse train of $N \geq 2$ is set at a value different from a low power level WL2 of the trailing amorphous point in the train, so that the amorphous points are formed with a fixed maximum temperature for keeping constant heat remaining in the recording medium and keeping constant a cooling rate for forming all amorphous points in the train, and wherein each low power level WL1 and WL2 is insufficient to form or erase an amorphous point, wherein WL2 is greater than WL1.

33. An information recording method according to claim 31, wherein the power of said recording pulses during said generating is controlled so that a high power level WH1 for all but a leading amorphous point of a record mark pulse train of $N \geq 2$ is set at a value different from a high power level WH2 of the leading amorphous point in the train, so that the amorphous points are formed with a fixed maximum temperature for keeping constant heat remaining in the recording medium and keeping constant a cooling rate for forming all amorphous points in the train, and wherein each high power level WH1 and WH2 is sufficient to form an amorphous point, wherein WH1 is greater than WH2.

34. An information recording method according to claim 33, wherein said step of generating a record mark is performed by irradiating the recording medium with N pairs of high power recording pulses of the beam and a lower power recording pulse; and wherein the method further comprises the step of controlling power of said pulses during said generating so that a low power level WL1 for all but a trailing amorphous point of a record mark pulse train of $N \geq 2$ is set at a value different from a low power level WL2 of the trailing amorphous point in the train, so that the amorphous points are formed with a fixed maximum temperature for keeping constant heat remaining in the recording medium and keeping constant a cooling rate for forming all amorphous points in the train, and wherein each low power level WL1 and WL2 is insufficient to form or erase an amorphous point, wherein WL2 is greater than WL1.

35. An information recording method according to claim 34, wherein said controlling power of said pulses during said generating and erasing is performed so that WH/WL>EH/EL then T1 is greater than T2, and so that WH/WL<EH/EL when T1 is less than T2, where light intensity of the high power recording pulse is WH, light intensity of the lower power recording pulse is WL, light intensity for the high power erasing pulse is EH, light intensity for the lower power erasing pulse is EL, the maximum temperature for generating the record mark is T1, and the maximum temperature for erasing the record mark is T2; and wherein said controlling power of said pulses during said generating and said erasing is performed so that integration of power per pulse of WH and WL with respect to time substantially equals the integration of power of EH and EL with respect to time, so that recording sensitivity and control of thermal interference of record marks is independent of whether a preceding pulse is said recording pulse or said erasing pulse and so that a temperature of the recording medium is approximately constant at an irradiating start position of pulses of a pulse train independently of the preceding pulse, wherein intensity of the high power recording pulse is WH and sufficient to form an amorphous point, intensity of the lower power light recording pulse is WL and insufficient to form an amorphous point, intensity for the high power erasing pulse is EH and is sufficient to crystallize an amorphous point, and intensity for the lower power erasing pulse is EL.

36. An information recording method according to claim 31, wherein said power of said pulses during said generating and said erasing is controlled so that integration of power per pulse of WH and WL with respect to time substantially equals the integration of power of EH and EL with respect to time, so that recording sensitivity and control of thermal interference of record marks is independent of whether a preceding pulse is said recording pulse or said erasing pulse and so that a temperature of the recording medium is approximately constant at an irradiating start position of pulses of a pulse train independently of the preceding pulse, wherein intensity of the high power recording pulse is WH and sufficient to form an amorphous point, intensity of the lower power light recording pulse is WL and insufficient to form an amorphous point, intensity for the high power erasing pulse is EH and is sufficient to crystallize an amorphous point, and intensity for the lower power erasing pulse is EL.

37. An information recording method according to claim 31, wherein said step of changing is further in response to a subsequent recording request, and includes retrieving the result from a storage.

38. An information recording method according to claim 31, further comprising the step of loading the recording medium, and in response to said loading, reading information from record marks on said recording medium to produce the reproduced signal and performing said steps of detecting and changing.

39. An information recording method according to claim 38, wherein said step of changing is in response to a subsequent recording request and includes retrieving the result from a storage.

40. An information recording method, comprising the steps of:

relatively moving an information recording medium and an irradiating energy beam;

generating a test pattern of record marks of one or more amorphous points on the recording medium by irradiating the recording medium with pairs of a high power recording pulse of the beam with a time width t and a lower power light pulse with a time width Tw-t, where Tw is the minimum time width of each amorphous point on the recording medium making up the record mark in a specified record area of the recording medium, to change a state of points on the recording medium by thermal energy sufficiently to impart test information to be subsequently discriminated by irradiating the recording medium with a reading light beam;

reproducing the test information by irradiating the test pattern on the medium; and setting at least one of power of the high power recording pulse for said step of generating and the time width t for said step of generating in accordance with the test information reproduced from the test pattern.

41. An information recording method according to claim 40, wherein said steps of generating and reproducing are conducted together with comparing the test information obtained by said reproducing with a reference and storing a corresponding comparison result, all prior to receiving a recording request; and thereafter retrieving said comparison result from storage in response to receipt of a recording request, thereafter performing said setting on the basis of said comparison result, and thereafter generating record marks according to the recording request.

42. An information recording method, comprising the steps of:

relatively moving an information recording medium and an irradiating energy beam;

generating a mark on the recording medium by irradiating the recording medium with N pairs of a high power pulse of the beam with a time width t and a lower power pulse of the beam with a time width Tw-t, where Tw is the minimum unit of time width of each mark on the recording medium in a specified record area of the medium to change a state of N points on the recording medium by thermal energy sufficiently to impart information to be subsequently discriminated by irradiating the recording medium with a reading beam;

comparing with a reference at least one of amplitude and average value of signals reproduced from the recording medium by the beam irradiating the marks; and controlling, during a subsequent said generating step, one of the power and the time width of the high-power pulse in accordance with results of said comparing.

43. An information recording method according to claim 42, wherein said controlling includes recording the result on the recording medium and subsequently retrieving the result at the time of the subsequent said generating step.

44. An information recording apparatus, comprising:

a disk having phase change optical information recording disk medium;

an optical system for providing a pulse width modulated light beam at power levels for recording and reproducing information on the phase change optical information recording disk medium;

a mechanism, including a motor, for relatively moving the optical information recording medium relative to the light beam for the recording and reproducing;

a control circuit for controlling power of the light beam and controlling pulse width modulation of the light beam, said circuit including a servo phase lock loop producing a constant frequency servo clock and a data phase lock loop producing a data clock of a frequency that varies according to relative radial positions of the light beam and the disk, which servo and data phase lock loops are independent of each other in generating respectively the servo clock and data clock from a feedback of reproduced data from the information recording medium; and wherein said control circuit controls the recording and reproducing of data in accordance with a ZCAV (Zoned Constant Angular Velocity) with said data clock, and controls said recording and reproducing of servo information in accordance with a CAV (Constant Angular Velocity) with said servo clock.

* * * * *